United States Patent
Ziggiotti et al.

[11] 3,852,271
[45] Dec. 3, 1974

[54] PROCESS FOR THE PREPARATION OF 7-CHLORO-BENZODIAZEPINE DERIVATIVES

[75] Inventors: Antonio Ziggiotti, Vezia Ticino, Switzerland; Francesco Mauri; Giovanna Riva, both of Milano, Italy

[73] Assignee: Ravizza S.A., Lausanne, Switzerland

[22] Filed: Mar. 1, 1972

[21] Appl. No.: 230,994

[30] Foreign Application Priority Data
Mar. 5, 1971 Great Britain...................... 6140/71

[52] U.S. Cl. .......................... 260/239.3 D, 260/999
[51] Int. Cl............................................. C07d 53/06
[58] Field of Search ............... 260/239.3 D, 570 AB

[56] References Cited
UNITED STATES PATENTS
3,635,948  1/1972  Ning et al..................... 260/239 BD

*Primary Examiner*—Henry R. Jiles
*Assistant Examiner*—Robert T. Bond
*Attorney, Agent, or Firm*—Stevens, Davis, Miller & Mosher

[57] ABSTRACT

Process for the preparation of 7-Cl benzodiazepine derivatives comprised in the general formula

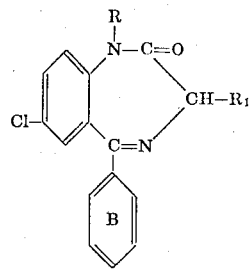

wherein R = H, $CH_3$, $R_1$ = H, OH, $OCOCH_3$ and the ring B may be substituted or unsubstituted, characterized in that a benzodiazepine of the formula

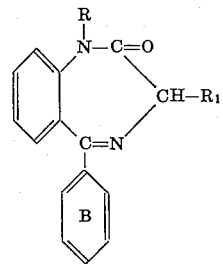

wherein R, $R_1$ and B have the above indicated meanings, is chlorinated with elemental chlorine in the presence of nitrobenzene as the solvent.

1 Claim, No Drawings

PROCESS FOR THE PREPARATION OF 7-CHLORO-BENZODIAZEPINE DERIVATIVES

This invention relates to a process for the preparation of 7-chloro-benzodiazepine derivatives.

It is known that benzodiazepines constitute a class of highly interesting compounds which have found wide use in the field of psycodrugs. Particularly good results have been obtained with 7-chloro-diazepine derivatives of the general formula:

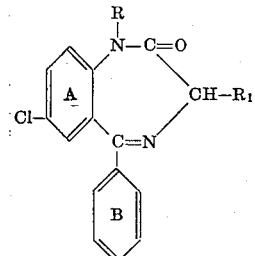

wherein R represents a hydrogen atom or a methyl radical and $R_1$ represents a hydrogen atom or a hydroxy or acetoxy radical.

These compounds have hitherto been prepared from starting materials already containing a chlorine atom at the appropriate position in a ring A.

This invention provides a process for the preparation of 7-chloro-benzodiazepine derivatives of the general formula:

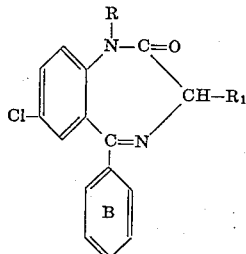

wherein R and $R_1$ are as above described and the ring B is substituted or unsubstituted, wherein a solution of benzodiazepine having the formula:

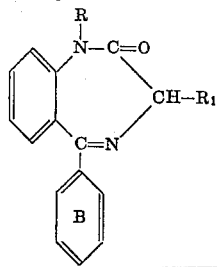

wherein R, $R_1$ and the ring B have the above indicated meanings in nitrobenzene is reacted with elemental chlorine.

The following Examples illustrate the invention.

EXAMPLE 1

2.9 g of 3-acetoxy-5-phenyl-1,4-benzodiazepine-2-(1H)-one were suspended in 30 ml of nitrobenzene and whilst stirring 0.8 g of gaseous chlorine was dissolved therein. After a few minutes a clear solution formed and after two hours the precipitation of a crystalline product commenced. The mixture was stirred for a further 24 hours in the dark, and then 30 ml of diethyl ether were added and the resulting precipitate was filtered.

The precipitate was suspended in 20 ml of acetic acid and the mineral acid was neutralized with sodium acetate. Then water was added little by little up to incipient crystallization, the mixture was left at rest for 1 hour and the resulting precipitate was filtered and washed with water.

1.1 g of 7-chloro-3-acetoxy-5-phenyl-1,4-benzodiazepine-2-(1H)-one were obtained showing a melting point of 248° to 250° C. Nearly all the unconverted starting material was recovered from the mother liquors.

EXAMPLE 2

10 g of 1,3-dihydro-5-phenyl-1,4-benzodiazepine-2-one were suspended in 70 ml of nitrobenzene and 3.2 g of chlorine were dissolved therein while maintaining the temperature not higher than 20° C.

The mixture was stirred in the dark for 48 hours. The product that separated was suspended in 100 ml of water and 100 ml of diethyl ether and neutralized with sodium bicarbonate whilst stirring.

After crystallization from 70 percent ethyl alcohol 5.5 g of 7-chloro-5-phenyl-3H-1,4-benzodiazepine-2-(1H)-one were obtained, M.P. 215° C. All the unconverted starting material was recovered from the mother liquors.

We claim:

1. A process for the preparation of a 7-chloro-benzodiazepine-2-one of the formula

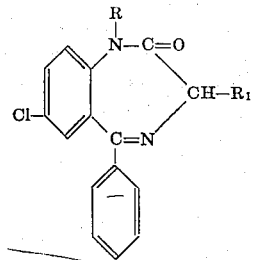

wherein R = H, $CH_3$; $R_1$ = H, OH, $OCOCH_3$, characterized in that a benzodiazepine of the formula

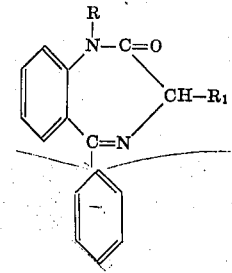

wherein R and $R_1$ have the above indicated meanings, is chlorinated with elemental chlorine in the presence of nitrobenzene as the solvent at a temperature of not higher than 20° C.

* * * * *